US006398079B1

(12) United States Patent
Garcia et al.

(10) Patent No.: US 6,398,079 B1
(45) Date of Patent: Jun. 4, 2002

(54) TWO-PHASE DISPENSING DEVICE

(75) Inventors: Firmin Garcia, Evreux; Stéphane Beranger, Surtauville; Aline Abergel, Boulogne Billancourt, all of (FR)

(73) Assignee: Valois S.A., Le Neubourg (FR)

( * ) Notice: Subject to any disclaimer, the term of this patent is extended or adjusted under 35 U.S.C. 154(b) by 0 days.

(21) Appl. No.: 09/959,151

(22) PCT Filed: Apr. 19, 2000

(86) PCT No.: PCT/FR00/01018

§ 371 (c)(1), (2), (4) Date: Oct. 18, 2001

(87) PCT Pub. No.: WO00/64593

PCT Pub. Date: Nov. 2, 2000

(30) Foreign Application Priority Data

Apr. 22, 1999 (FR) ........................................... 99 05118

(51) Int. Cl.[7] ................................................ G01F 11/06

(52) U.S. Cl. .................. 222/190; 222/321.2; 222/321.9

(58) Field of Search ............................. 222/190, 321.9, 222/321.2; 239/419.5, 423, 504

(56) References Cited

U.S. PATENT DOCUMENTS

| | | | | |
|---|---|---|---|---|
| 5,443,569 A | * | 8/1995 | Uehira et al. | 222/190 |
| 5,570,819 A | * | 11/1996 | Uehira et al. | 220/190 |

FOREIGN PATENT DOCUMENTS

| | | | |
|---|---|---|---|
| EP | 613728 A | * | 9/1994 |
| WO | WO-00/64593 A | * | 11/2000 |

* cited by examiner

*Primary Examiner*—Philippe Derakshani
(74) *Attorney, Agent, or Firm*—Sughrue Mion, PLLC

(57) ABSTRACT

A fluid dispenser device comprising: a fluid pump (1) comprising: a pump body (10) provided with an inlet valve member (12); an actuating rod (2) mounted to move axially in the body (10); and a free piston (3) mounted to slide in leaktight manner in the body (10), the piston (3) being mounted to move over the actuating rod (2) to form an outlet valve member (332) therewith; and an air pump comprising an air chamber (54) provided with an inlet valve member (515), with an outlet valve member (331), and with a piston (48) for compressing the air in the chamber; the fluid dispenser device being characterized in that the outlet valve (332) of the fluid pump and the outlet valve (331) of the air pump open out into a common duct (23).

11 Claims, 3 Drawing Sheets

Figure 1:
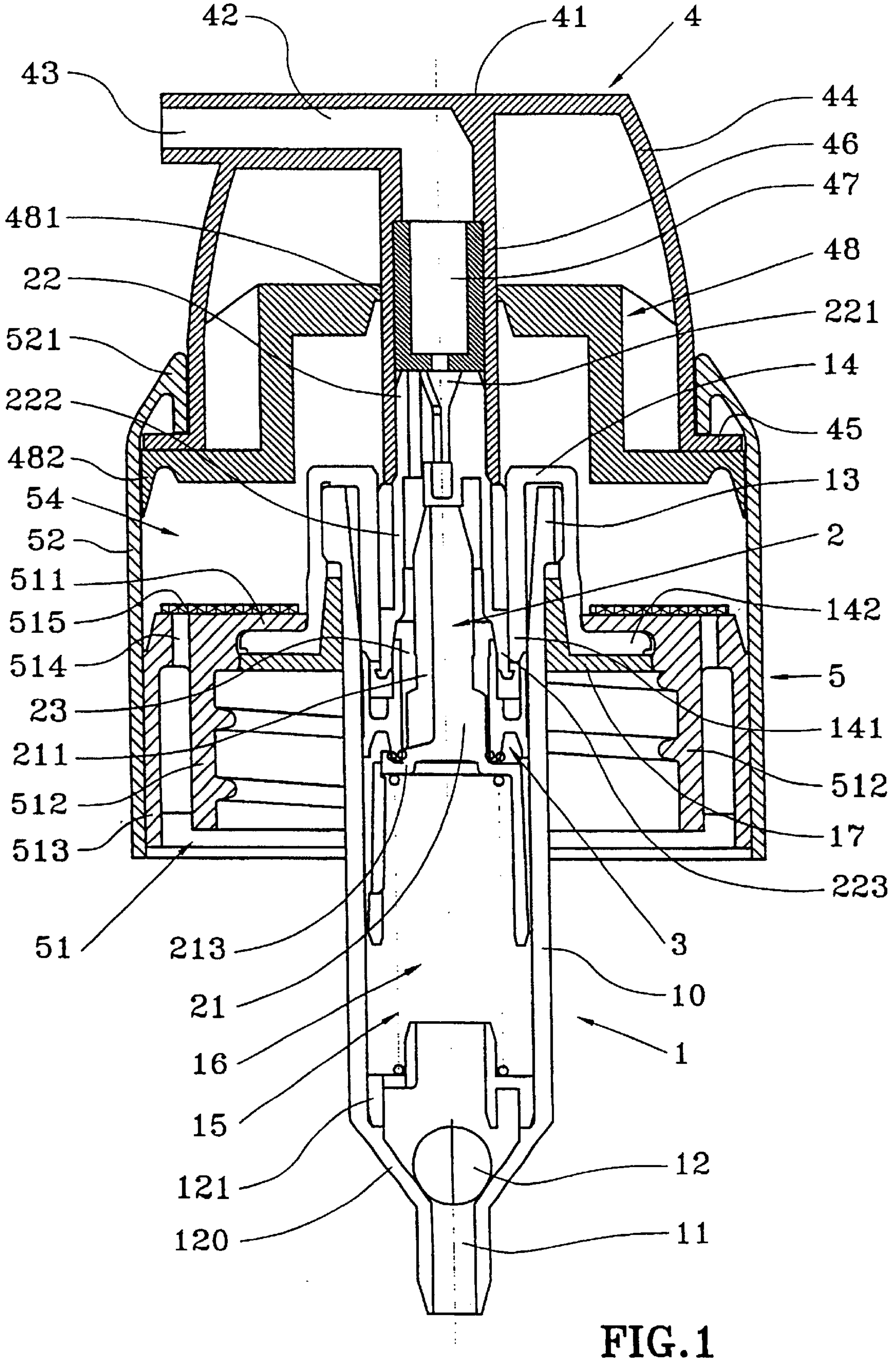

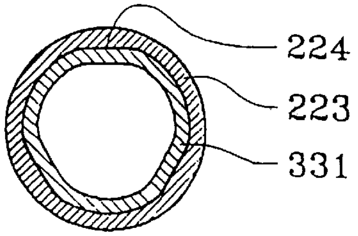
FIG.2c
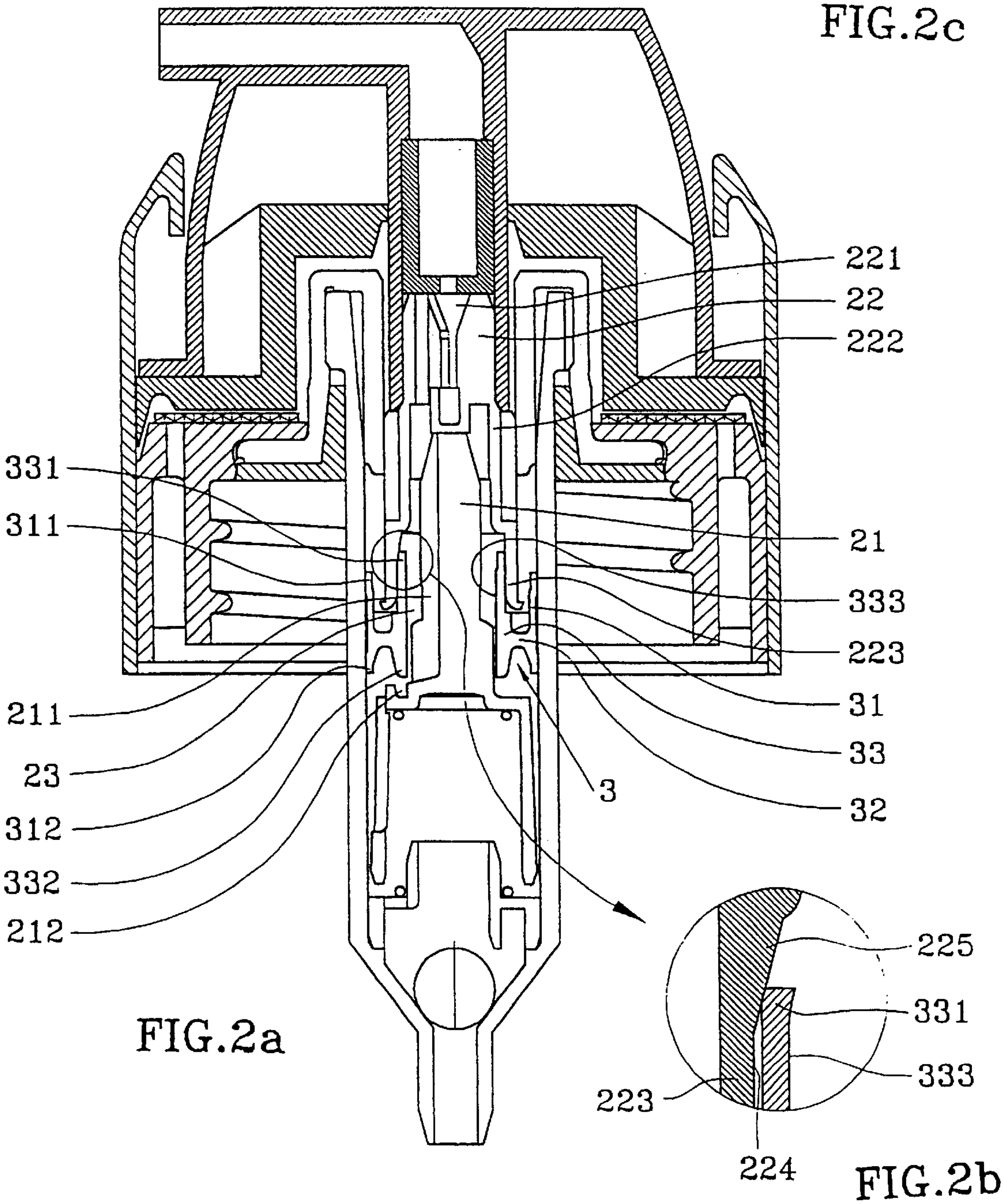
FIG.2a
FIG.2b

TWO-PHASE DISPENSING DEVICE

The present invention relates to a two-phase dispenser device, i.e. to a dispenser that makes it possible to dispense a fluid and a gas (in general, air) simultaneously. This type of dispenser device is generally mounted on a reservoir containing the fluid to be dispensed. Such a device can be used for two different uses: in a first use, this type of dispenser is used as a foam pump making it possible to dispense fluid in the form of foam, i.e. mixed with fine air bubbles. In a second use, the device can be used to dispense the fluid in the form of a jet of finely-sprayed droplets entrained by the flow of air. In either use, the dispenser device is of identical design, incorporating a fluid pump and an air pump. A difference between the two uses lies in the proportions of air and of fluid. When such a device is used to generate a foam, it is necessary to have a proportion of air that is large compared with the proportion of air necessary for the use in which the addition, when the dispenser is used as a foam pump, it further includes a foam-forming chamber, whereas when it is used as a spray, it is generally equipped with an outlet nozzle making it possible to disperse fluid in the form of fine droplets.

In this type of two-phase dispenser device, it is important for the fluid to be mixed with the air as homogeneously as possible so as to avoid dispensing the fluid chaotically. Such homogeneous mixing is foam pump.

It has been observed that the homogeneity of the mixture depends to a large extent on the volume in which the mixture is formed, and more precisely on the turbulence that can be generated in that volume. In most prior art dispenser devices, the air is mixed with the fluid at the outlet of the dispenser, or else at the outlet of the fluid pump, as in Document EP-0 511 894.

Another prior art document, namely Document WO 95/30490, describes a two-phase dispenser device in rod, the free piston further being mounted to slide in a pump body so as to define the pump chamber. The free piston co-operates with the actuating rod to define the top valve of the fluid pump and the top valve of the air pump, the fluid under pressure flows into an internal duct formed inside the actuating rod. In addition, at the outlet of the top valve of the air chamber, the pressurized air flows through a separate duct. The fluid duct and the air duct meet at a spray nozzle that makes it possible to dispense the fluid in the form of a jet of fine droplets. There too, the air and the fluid are mixed only in a very small volume defined by the very limited inside volume of the nozzle. It should be noted dispensing in the form of a spray, and not for dispensing in the form of a foam. Therefore, the homogeneity of the fluid and air mixture is not an objective that is particularly sought after, unlike when the dispenser is used as a foam pump.

Mention may also be made of Japanese Patent JP-09193953 which describes a pump in which the outlet valve of the fluid pump is formed at the bottom end of the actuating rod, while the air chamber (which does not actuating rod, in the vicinity of the pusher. The fluid is delivered into the actuating rod and is mixed with air only at the outlet of the rod.

Another pump described in Document EP-0 613 728 is provided with a fluid outlet valve situated at the top end of the actuating rod and with an air pump outlet valve that communicates with the top end of the actuating rod via an air passageway which extends around the actuating rod. There too, the fluid and the air are mixed only at the outlet of the actuating rod, so that the mixing volume is small.

An object of the present invention is thus to define a two-phase dispenser device, particularly but not exclusively a foam pump, in which the fluid and the air are mixed in a large volume, making it possible for the mixture to have good homogeneity.

To this end, the present invention provides a fluid dispenser device comprising:

- a fluid pump comprising:
  - a pump body provided with an inlet valve member;
  - an actuating rod mounted to move axially in the body; and
  - a free piston mounted to slide in leaktight manner in the body, said piston being mounted to move over the actuating rod to form an outlet valve member therewith; and
- an air pump comprising an air chamber provided with an inlet valve member, with an outlet valve member, and with a piston for compressing the air in the chamber;
- the outlet valve of the fluid pump and the outlet valve of the air pump opening out into a common duct.

Thus, by causing the two pump chambers to open out into a common duct, the fluid and the air are mixed as early as possible, so that the mixing takes place in a volume that is larger than when the air is mixed with the fluid only at the outlet of the dispenser device. Also, the path along which the fluid and the air flow together is very long and sinuous, which contributes to forming turbulence that is necessary for foam of good quality.

Advantageously, the outlet valve of the air pump is formed by the free piston. Therefore, a single part performs the two functions of moving member and of outlet valve. In addition, the actuating rod forms a valve seat for the outlet valve of the air pump. Thus, the free piston firstly makes it possible to isolate the two chambers from each other, and secondly forms the moving valve member for the outlet valves of both chambers.

In order to increase the volume in which the fluid and the air mix, at the free piston the actuating rod defines a plurality of radial channels surrounded by an inside wall of the free piston, together defining a portion of said common duct. It is thus possible for that portion of the actuating rod which is situated at the free piston to be formed such that it has a cross-section substantially in the shape of a three-, four-, or five-pointed star, depending on the number of radial channels that are to be formed. The sum of the cross-sectional areas of the various radial channels is considerably larger than the cross-sectional area of a conventional internal channel extending inside the actuating rod. Therefore, the geometrical shape of the mixing volume is very complex and, as a result, it generates considerable turbulence. In addition, since the common duct has a large cross-sectional area, there is only a very small amount of head loss at the outlets of the valves, which makes it possible for the dispenser device to be particularly easy and smooth to actuate.

In one embodiment, the free piston is provided with at least one sealing lip in leaktight sliding contact with the body, and is provided with a sealing lip in leaktight sliding contact with the actuating rod. In addition, the actuating rod includes a bushing that defines an inside sliding wall against which the sealing lip is in leaktight sliding contact. It is advantageous for the piston to penetrate into the bushing with its sealing lip: in this way, the sealing lip is pressed strongly against the inside sliding wall by the fluid under pressure that flows through the common duct at the outlet of the valve. It is thus possible to avoid any risk of leakage where the lip of the piston is in sliding contact in the bushing of the rod.

In order to open the top outlet valve of the air pump, the inside sliding wall of the bushing is provided with at least one seal-breaking profile at which the sealing lip of the piston is no longer in leaktight contact, so as to form an air passageway through which air can pass to the common duct. In one embodiment, the seal-breaking profile is in the form of a recess or of a cut provided in the inside wall of the bushing. In a variant, the seal-breaking profile is in the form of a flat that interrupts the roundness in the inside wall of the bushing.

When such a dispenser device is used as a foam pump, the common duct communicates downstream with a foam-forming chamber. When the dispenser device is used as a spray, the common duct communicates downstream with an outlet spray nozzle.

The invention is described more fully below with reference to the accompanying drawings which give a non-limiting embodiment of the present invention.

In the drawings:

FIG. 1 is a vertical section view through a dispenser device of the invention in the rest position;

FIG. 2*a* is a vertical section view through the dispenser device of FIG. 1, in the actuated position;

FIG. 2*b* is an enlarged view of the detail circled in FIG. 2*a;*

Figure 2D:
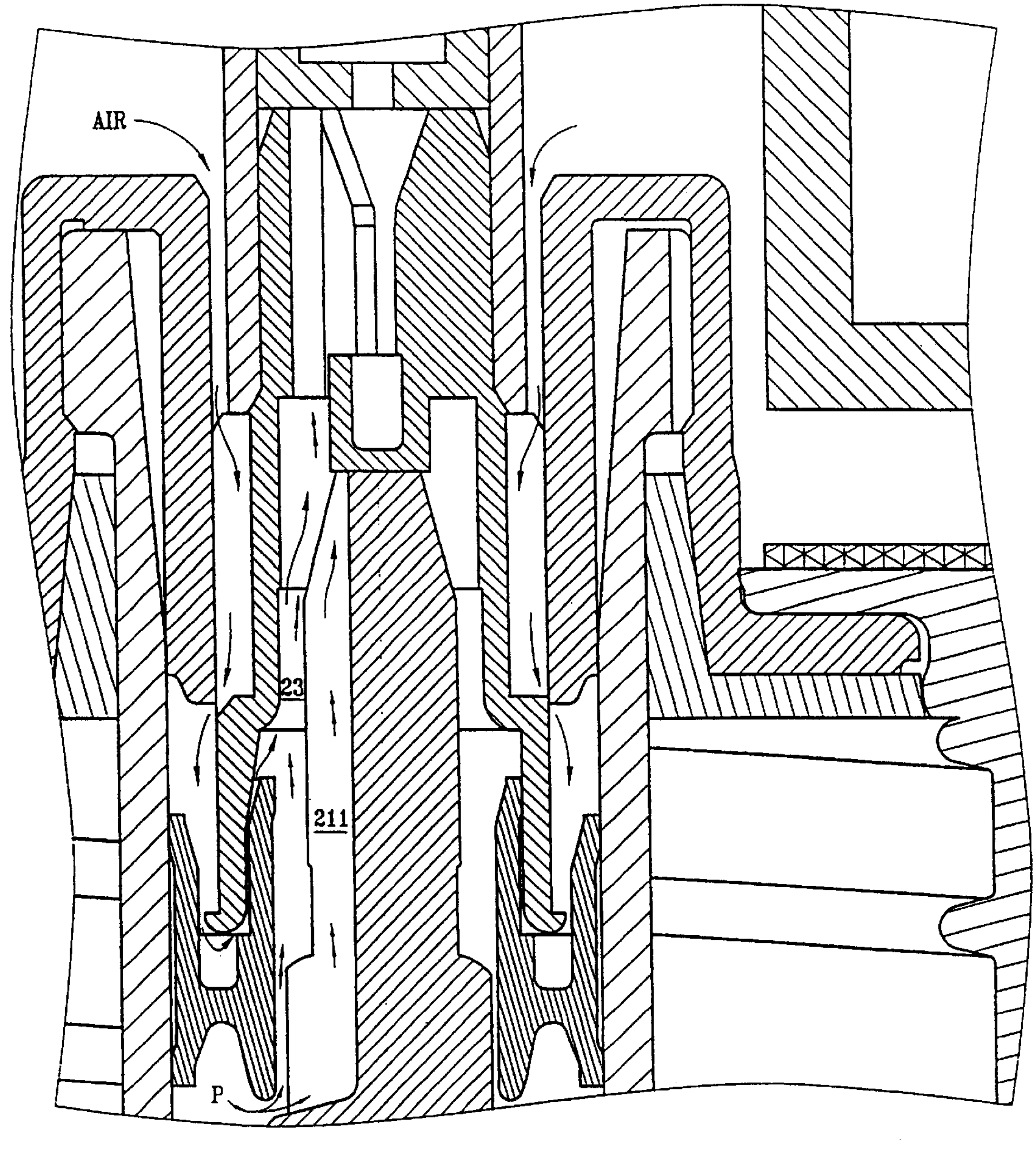

FIG. 2*c* is a horizontal section view at the detail shown in FIG. 2*b*; and FIG. 2*d* is a highly-enlarged view of a portion of the dispenser device, showing how the air and the fluid flow inside the device.

The dispenser device used to illustrate the present invention is a foam pump making it possible to dispense a fluid in a mixture with air so as to form a foam at the outlet of the dispenser device. In the present case, the fluid contained in a reservoir (not shown) contains a foaming agent which is suitable for expanding on contact with air so as to trap fine bubbles of air inside the fluid. A foam is thus obtained at the outlet of the dispenser. The present invention could also have been illustrated by means of a two-phase pump that makes it possible to dispense a sprayed jet of fine droplets of fluid. In which case, the outlet of the dispenser device is generally equipped with a spray nozzle.

Generally, the dispenser device of the invention comprises a fluid pump given overall numerical reference 1 and an air pump defining an air chamber 54 of variable volume. The device is provided with a pusher 4 that has a pressible surface 41 that is pressed to actuate the fluid pump and the air pump simultaneously. The dispenser device further comprises outer trim 52 engaged in leaktight manner on an inner fixing ring 51 serving to fix the device to the neck of a reservoir (not shown) containing the fluid to be dispensed. The air chamber 54 is situated substantially around the fluid pump 1, with a wall of the fixing ring 51 serving as an end wall for the air chamber 54, the inside wall of the trim 52 serving as a wall for slidably receiving in leaktight manner an air piston 48 that is substantially annular in shape and that is mounted inside the pusher 4. More precisely, at its top, the pusher 4 defines the pressible surface 41 that is connected to a peripheral skirt 44 (bullet-shaped in this example) which is terminated by an outwardly-projecting collar 45. On the inside, the pusher 4 defines a sleeve 46 whose free bottom end serves for connection to an actuating rod 2 that is an integral part of the fluid pump 1. The sleeve 46 internally defines a duct that is extended upwards by an outlet channel 42 opening to the outside via an outlet orifice 43. In the particular use as a foam pump, the sleeve 46 internally receives an insert defining a foam-forming chamber 47. The chamber 47 is provided with a bottom inlet and with a top outlet, both of which are provided with filters for forming foam. The foam-forming chamber 47 may be in the form of a separate plastics part inserted by force into the sleeve 46 of the pusher 4 which can be formed integrally therewith.

The air piston 48 extends in a staggered annular shape around the sleeve 46 with which it is in leaktight contact at an annular sealing lip 481. This lip 48 procures static sealing at the sleeve 46. On its outside periphery, the air piston 48 defines a lip 482 serving to come into leaktight sliding contact with the inside wall of the trim 52. The bottom annular surface of the outside collar 45 of the pusher 4 is in contact with the outside periphery of the air piston 48 substantially at the dynamic sealing lip 482. In FIG. 1, the dispenser device is shown in the rest position, in which the outside collar 45 of the pusher 4 is in abutment against an inside rim 521 of the trim 52 that serves to set top dead center for the air pump.

Thus, by pressing on the pressible surface 41 of the pusher 4, the pusher is caused to drive the air piston 48, thereby reducing the inside volume of the air chamber 54. Air is thus put under pressure.

As mentioned above, the trim 52 is engaged in leaktight manner on the fixing ring 51 which forms the end wall of the air chamber 54. To this end, the fixing ring 51 is formed with an outer ring 513 in leaktight contact with the inside wall of the trim 52, and with a screw inner ring 512 formed with an inside thread serving to co-operate with an outside thread formed on the neck of the receptacle (not shown). The fixing takes place by screwing in this example, but naturally other fixing techniques may be considered without going beyond the ambit of the invention. At their top ends, the outer ring 513 and the inner ring 512 are interconnected and extended inwards by an inside annular flange 511 defining a central opening through which the fluid pump 1 passes. This inside flange 511 comes into engagement with an outside fixing collar 142 which is an integral part of the fluid pump 1. Thus, by screwing the ring 512 onto the threaded neck of the reservoir (not shown), the inside flange 511 is caused to press the collar 142 against the top end of the neck optionally with a sealing gasket 17 being interposed. In this way, the dispenser device is fixed to a fluid reservoir.

In the invention, substantially where the outer ring 512 meets the inner ring 512, the fixing ring 51 forms a plurality of air intake channels 514 which are selectively closed off by a flexible washer 515 which comes to be pressed against the outlets of the ducts 514. Thus, when an increase in pressure is generated in the air chamber 54, the washer 515 is pressed by the pressure against the ducts 514, thereby closing them off in airtight manner. Conversely, as soon as suction is generated inside the air chamber 54, air can be sucked through the ducts 514, thereby lifting the washer 515 away slightly. In other words, the washer 515 in combination with the ducts 514 forms the air intake valve for the air chamber 54.

As regards the outlet valve of the air chamber 54, it is described below in conjunction with the description of the fluid pump 1.

The fluid pump 1 comprises a pump body 10 that is cylindrical in overall shape, and that has its bottom end provided with an inlet 11 to which a dip tube may be connected. Above the inlet 11, the pump body 10 defines a valve seat 120 for a ball 12 serving as a bottom valve member. The ball 12 is advantageously confined within a a limited space defined by an insert 121 against which the bottom end of a return spring 15 comes to bear. At its top end, the pump body 10 is provided with an annular reinforcement 13 projecting outwards and inserted by snap-fastening into a recess formed by a turret 14 which, on its outside, forms the holding collar 142 serving to come into engagement between the flange 511 of the fixing ring 51 and the top end of the neck of the reservoir (not shown) with a gasket 17 optionally being interposed. An air intake passageway may be formed in the peripheral reinforcement 13 to make it possible for air to penetrate into the reservoir from the outside as the fluid is dispensed by the pump 1. Inside the body 10, the turret 14 defines a ferrule 141 which makes it possible to limit the stroke of the pump 1 and to set its rest position.

The fluid pump 1 is conventionally provided with an actuating rod 2 against the bottom end of which the other end of the return spring 15 bears so as to urge the actuating rod 2 into its rest position shown in FIG. 1. The actuating rod 2 is provided with a free piston 3 which can move over the actuating rod 2 over a limited distance. The numerical references relating to the free piston 3 are visible in FIG. 2*a*. The free piston 3 is thus mounted to slide over the actuating rod 2 and it also slides inside the pump body 10 in leaktight manner.

In this example, the actuating rod 2 is made up of a bottom portion 21 and of a top portion 22, the two portions being interconnected, e.g. as a force fit. The top portion 22 defines a flow passageway 221 at its top end which is inserted into the sleeve 46 defined by the pusher 4. Below this segment forming the flow passageway 221, the top portion 22 defines a substantially-cylindrical skirt 222 whose bottom end defines a bushing 223 mounted to slide in leaktight manner.

The bottom portion 21 is inserted into the top portion 22 so that the substantially-cylindrical skirt 222 surrounds the bottom portion 21 in part. As assembled together, the bottom portion 21 and the top portion 22 define between them a duct 23 that communicates with the flow passageway 22 formed at the top end of the top portion 22. Over a large portion of its height, the bottom portion 21 defines a plurality of radial channels 211 that extend to the vicinity of the bottom end of the bottom portion 21 where it forms a plateau 213 in which an annular furrow 212 is formed that serves as a seat for the outlet valve. The furrow 212 is formed on the top surface of the plateau 213, while the bottom surface of the plateau 213 receives the top end of the return spring 15.

The free piston 3 is mounted on the bottom portion 21 of the actuating rod 2. The piston 3 comprises an inner sheath 33 whose inside defines an inside wall 333 which surrounds the bottom portion 21 provided with the radial channels 211. The bottom end of the sheath 33 forms a top valve member 332 suitable for coming into leaktight contact in the annular furrow 212 formed by the bottom portion of the actuating rod, as can be seen in FIG. 1, in the rest position. At its top end, the sheath 33 defines a lip 331 suitable for coming into leaktight sliding contact with the inside wall 224 formed by the slide bushing 223 of the actuating rod 2. Thus, in the rest position, the sheath 33 of the piston 3 rests in leaktight manner in the valve seat furrow 212 and against the inside wall 224 of the bushing 223 mounted to slide in leaktight manner. The piston 3 further comprises an outer ring 31 connected to the sheath 33 via a link flange 32. The outer ring 31 defines respective sealing lips 311 and 312 at either one of its ends, which lips are in leaktight sliding contact against the inside wall of the pump body 10. In the rest position shown in FIG. 1, the top sealing lip 311 of the piston 3 comes into abutment against the bottom end of the ferrule 141 so as to set top dead center for the pump 1.

The fluid pump 1 operates as follows: when the pusher 4 is pressed, the actuating rod is pushed into the pump body 10 so that the volume of the pump chamber decreases. To compensate for this reduction in volume, the free piston 3 which is then no longer in abutting contact with the ferrule 141 moves relative to the actuating rod 2 so as to open the top valve, thereby forming an outlet passageway for the fluid which then flows between the piston 3 and the bottom portion 21 of the actuating rod 2. The fluid then flows along a duct 23. From there, it flows through the passageway 221, then through the chamber 47, and finally through the outlet channel 42 which opens out at 43 to the outside. It should be noted that the piston 3, and more particularly its inside wall 333, partially defines the outside wall of the duct that makes it possible to connect the outlet of the top valve to the passageway 221 leading to the outside. Since the inside diameter of the sheath 33 is relatively large compared with the diameter of duct inside the actuator rod of a conventional dispenser, a large through cross-sectional area is provided that thus defines a large inside volume and that induces only a small amount of head loss. Thus, as of the outlet of the top valve, a large volume is available in which the foaming fluid can be mixed with the air coming from the air pump.

In the invention, the outlet valve of the air pump is defined by the sheath 33 of the piston 3 where it is contact with the slide bushing 223. The air that is compressed in the pump chamber 54 finds an outlet passageway defined between the actuating rod 2 and the ferrule 141, as can be seen in FIG. 2*d*. More precisely, in a first stage, air escapes between the bottom portion of the sleeve 46 of the pusher 4 and the ferrule 141 of the turret 14. Then the air finds a passageway between the top portion 21 (more precisely the skirt 22) and the ferrule 141. Lower down, the air flows between the bushing 223 and the inside wall of the pump body and then between the ring and the piston. The flow passageway along which the air flows is indicated by bold arrows in FIG. 2*d*. The air thus arrives where the sealing lip 331 of the piston 3 is in contact with the inside wall 224 of the bushing 223. Since the contact is leaktight, the air finds no passageway at this place. In the invention, the inside wall 224 of the bushing 223 is formed with a profile 225 that makes it possible to interrupt the leaktight contact between the lip 331 and the wall 224. For example, this seal-breaking profile 225 may be in the form of cuts or grooves at which the lip 331 cannot establish leaktight contact. In a variant of the invention, shown in FIG. 2*c*, the seal-breaking profile 225 may be in the form of flats that interrupt the circularly-cylindrical shape of the wall 224 so that, where the flats meet the cylinder segments, edges are formed at which the lip 331 cannot come into leaktight contact. In any event, the present invention is not limited to any particular shape for the seal-breaking profile 225, providing air can find a flow passageway at this level when the dispenser device is in the actuated position shown in FIG. 2*a*.

In the invention, the air that flows beyond the top valve formed by the sealing lip 331 in sliding contact with the wall 224 opens out into the duct into which the fluid flows. The air under pressure and the fluid under pressure thus flow through a common duct 23 formed between the piston 3 and the actuating rod 3 in its bottom portion, then between the bottom portion 21 and the top portion 22 of the actuating rod 2. The pressurized air is thus injected into the pump 1 in the vicinity of the top valve of the fluid pump so that the air and the foaming fluid are mixed immediately at the outlets of the top valves respectively of the fluid pump and of the air pump. Thus a large and complex mixing volume is available since firstly, it is relatively long, and secondly, because of the particularly advantageous design of the actuating rod 2, an inside volume is available that has a complicated configuration.

The principle of the present invention is based on the fact that the free piston is used to form the two outlet valves of the fluid pump and of the air pump so that they open out into a common duct 23 which, in addition, has a large and complex mixing volume. Furthermore, since the sheath 33 is constrained to move over the seal-breaking profiles 225 under the effect of the fluid under pressure, opening of the top valve of the air pump 54 is thus guaranteed.

It should also be noted that the fluid pump is used to form a mixing chamber, so that, on exiting from the actuating rod, the fluid is already in the form of a foam. The foam-forming chamber situated in the pusher enables the quality of the foam to be further improved. Thus, in the present invention, there are two foam-forming stages. A conventional foam pumps has, at the most, a single foam-forming chamber into which air is injected.

A dispenser device is thus obtained that is particularly effective for dispensing a foam, but that naturally may be used as a dispenser for dispensing a jet of sprayed fluid.

What is claimed is:

1. A fluid dispenser device comprising:

a fluid pump (1) comprising:

a pump body (10) provided with an inlet valve member (12);

an actuating rod (2) mounted to move axially in the body (10); and a free piston (3) mounted to slide in leaktight manner in the body (10), said piston (3) being mounted to move over the actuating rod (2) to form an outlet valve member (332) therewith which opens out into a fluid outlet duct (23); and an air pump comprising an air chamber (54) provided with an inlet valve member (515), with an outlet valve member (331), and with a piston (48) for compressing the air in the chamber;

said fluid dispenser device being characterized in that the outlet valve (331) of the air pump opens out directly into the fluid outlet duct (23).

2. A dispenser device according to claim 1, in which the outlet valve (331) of the air pump is formed by the free piston (3).

3. A dispenser device according to claim 2, in which the actuating rod (2) forms a valve seat (23) for the outlet valve (331) of the air pump.

4. A dispenser device according to claim 2, in which, at the free piston (3), the actuating rod (2) defines a plurality of radial channels (21) surrounded by an inside wall (333) of the free piston (3), together defining a portion of said duct (23).

5. A dispenser device according to claim 4, in which the free piston (3) is provided with at least one sealing lip (311, 312) in leaktight sliding contact with the body (10), and is provided with a sealing lip (331) in leaktight sliding contact with the actuating rod (2).

6. A dispenser device according to claim 5, in which the actuating rod (2) includes a bushing (223) that defines a inside sliding wall (224) against which the sealing lip (331) is in leaktight sliding contact.

7. A dispenser device according to claim 6, in which the inside sliding wall (224) of the bushing (223) is provided with at least one seal-breaking profile (225) at which the sealing lip (331) of the piston (3) is no longer in leaktight contact, so as to form an air passageway through which air can pass to the common duct (23).

8. A dispenser device according to claim 7, in which the seal-breaking profile is in the form of a recess or of a cut provided in the inside wall of the bushing.

9. A dispenser device according to claim 7, in which the seal-breaking profile is in the form of a flat that interrupts the roundness in the inside wall of the bushing.

10. A dispenser device according to claim 1, in which the common duct (23) communicates downstream with a foam-forming chamber (47).

11. A dispenser device according to claim 1, in which the common duct (23) communicates downstream with an outlet spray nozzle.

* * * * *